United States Patent [19]

Hollenstein

[11] 4,444,219

[45] Apr. 24, 1984

[54] OVERPRESSURE VALVE FOR PACKAGES WITH FLEXIBLE WALLS

[75] Inventor: Erwin B. Hollenstein, Schwerzenbach, Switzerland

[73] Assignee: Wipf AG Verpackungen, Volketswil, Switzerland

[21] Appl. No.: 393,444

[22] Filed: Jun. 29, 1982

[30] Foreign Application Priority Data

Jun. 29, 1981 [DE] Fed. Rep. of Germany ....... 3125496

[51] Int. Cl.³ .................... F16K 51/00; F16K 15/16
[52] U.S. Cl. .............................. 137/246; 137/512.15; 137/516.25; 137/856; 137/516.11; 383/103; 426/118
[58] Field of Search ............... 137/237, 246, 247, 248, 137/516.25, 512.15, 512.4, 843, 852, 854, 856, 516.11; 229/DIG. 14; 383/45, 103; 426/118

[56] References Cited

U.S. PATENT DOCUMENTS

| | | | |
|---|---|---|---|
| 1,075,354 | 10/1913 | Henson | 137/247 |
| 1,276,478 | 8/1918 | Bechtold | 137/512.4 |
| 1,797,280 | 3/1931 | Zerk | 137/843 |
| 2,158,351 | 5/1939 | Ames et al. | 137/516.11 |
| 2,752,943 | 7/1956 | Doeg | 137/512.15 |
| 3,292,652 | 12/1966 | Gallone | 137/246 |
| 3,354,903 | 11/1967 | Caruso | 137/512.15 |
| 3,595,467 | 7/1971 | Goglio | 137/843 |
| 3,679,193 | 7/1972 | Nieboer | 137/246 |
| 3,799,427 | 3/1974 | Goglio | 137/246 |
| 4,000,846 | 1/1977 | Gilbert | 426/118 |

FOREIGN PATENT DOCUMENTS

650642 2/1951 United Kingdom ........... 137/512.15

*Primary Examiner*—Alan Cohan
*Assistant Examiner*—John A. Rivell
*Attorney, Agent, or Firm*—Armstrong, Nikaido, Marmelstein & Kubovcik

[57] ABSTRACT

The present invention is with respect to an overpressure valve for packages with flexible walls, having a valve body able to be fluid-tightly joined with such a package. The valve body has a flat valve seat having thereon a diaphragm with a valve shutting part. In the seat there are valve openings, each having a number of concentric ring-like channels round it in the seat. The concentric channels take up a sealant, more specially silicone oil. The diaphragm is made of a single piece of material running on one side of the walls to the other without any holes therein. It is only kept in position in a middle part of the valve seat so that the diaphragm may be moved freely, at least over the valve openings. In the case of a preferred form of the invention, the diaphragm is slipped loosely into the valve body in which it is kept in position by a keeper in a middle part thereof. The keeper may be fixed in position by friction or by a keying effect.

23 Claims, 6 Drawing Figures

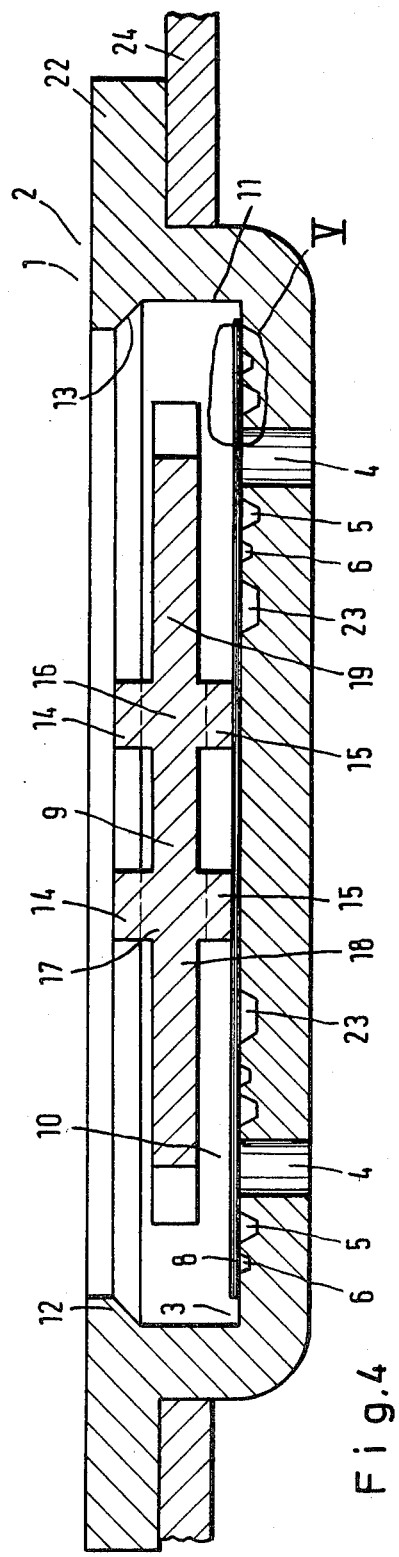
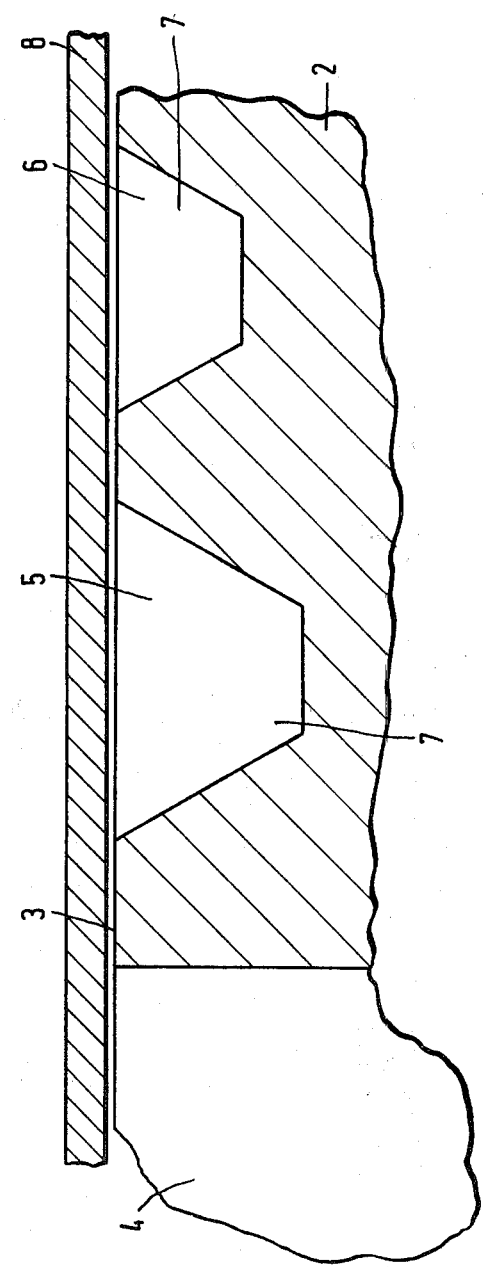
Fig.4
Fig.5

OVERPRESSURE VALVE FOR PACKAGES WITH FLEXIBLE WALLS

BACKGROUND OF THE INVENTION

The present invention is with respect to an overpressure or gas let-off valve, more specially for flexible packages, having a valve body designed to be joined to the wall of such a package fluid-tightly and an elastic diaphragm for shutting off valve openings in a valve seat in the valve body or housing, the valve openings being at the end of holes running through from one side of the valve body to an opposite side thereof.

A valve on these general lines is to be seen in German Offenlegungsschrift specification No. 2,549,855 in the name of Wipf AG Verpackungen.

Such valves are used more specially for flexible packages which, after being filled with foodstuffs, are heat-sealed for safeguarding the foodstuffs against the effects of air, oxygen and humidity when they are being transported and stored. If the foodstuffs are such that the oxygen present in the package is likely to be the cause of a drop in quality, such packages may be exhausted for freeing them of oxygen and then, if desired, filled with an inert gas, or they may be swilled out with a counter-current of inert gas for clearing them of such oxygen from the air.

In the case of roasted coffee trouble conditions are likely, more specially, in the case of ground coffee, inasfar as such coffee has the property of giving up large amounts of gas between two and thirty days after roasting, such gas being mainly carbon dioxide. If roasted coffee is stored in gas-tight packages of the sort noted, there will be a danger of the package bursting because of the building up of a gas pressure as the gas is let off by the coffee. For this reason, such packages have been designed with overpressure valves so that there is no chance of a pressure building up, see for example German Offenlegungsschrift specification 1,903,048, which is with respect to the use of an overpressure valve with a flexible package for this very purpose.

Such valves have to be such that they may be used in large numbers and, for this reason, have to be able to be produced at a low price. A further condition to be kept to by such a valve is stopping oxygen from the air making its way into the package; putting it differently, the valve has to be a check valve which is completely gas-tight in the one direction, that is to say from the outside to the inside. At the same time, the valve design has to be such that pressure inside the package is safely let off as from the very lowest valve opening pressure, that is to say gage pressure, inside the package in an outward direction. After the valve has been opened by the overpressure and the gas let off, the valve has to be able to go back automatically into its shut position, frequent opening and shutting operations, or at least a small number of such operations having to take place in a completely safe way so that there is still no chance of oxygen from the atmosphere making its way into the valved package. Furthermore, the valve has to be so designed that there is little chance of it being damaged by blows or the like, for example on transport and on loading and unloading of such packages.

The prior art valve of the sort noted does in fact keep to some of these conditions inasfar as it may be cheaply made of thermoplastic material. In this known valve, the valve seat within the valve body has a middle frusto-conical part, over which the diaphragm is stretched, the diaphragm itself having a gas let-off opening shut against the seat. Furthermore, at its outer edge, the diaphragm is welded onto the valve body. Along the edge of the frusto-conical middle part, used as the valve seat, there is a number of holes through the valve body running into the inside of the package when the valve is fixed in the package valve. The frusto-conical middle part furthermore has a number of concentric, radially running channels within which there is a sealant, more specially a silicone oil, the radially running channels starting at the holes at the edge of the valve seat and ending at the narrow end of the frusto-cone in a ring-channel placed round it. When the diaphragm is stretched on the valve seat, this ring-channel is placed round the hole in the diaphragm. In this case, in one form of the invention, the material of the wall of the flexible package may be used as the diaphragm, if it has a hole for this purpose.

Although, as we have seen, this known valve keeps to a large number of the conditions of good overpressure valve design, it does, however, at the same time, have certain shortcomings. One important shortcoming to be seen on general of the valve is that there is likely to be some trouble on making a good weld between the diaphragm and the valve body and the wall material of the package. Furthermore, this further operation—welding together—is likely to be an important price factor at the scale of production coming into question. Because the diaphragm forming material is fixed at its edge, when the known valve is worked by the overpressure, the elasticity of the material has to be overcome so that generally high opening pressures are necessary. Even if the diaphram is placed loosely over the frusto-conical part, friction in a radial direction has to be overcome for forming outlet paths running to the hole through the diaphragm. This is a further effect increasing the pressure needed for opening the valve. However, one of the conditions to be kept to by such a valved package to make certain of trouble-free operation is that the opening pressure is to be as low as possible. Because, furthermore, the holes running through into the inside of the package in the valve body are, generally speaking, grouped together at one point, it may further be the case that, when the package is used, because of dust-like material such as coffee powder, these let-off holes will become stopped up and there will be trouble on operation of the valve.

GENERAL OUTLINE OF THE INVENTION

One purpose of the present invention is that of making a better design of the known valve so that the valve is opened even by a very low pressure.

A further purpose of the invention is that of making it simpler and cheaper for the valve to be produced.

For effecting these purposes, and further purposes, in the invention the valve body has a flat design of the valve seat having the valve openings running through it as a number of holes starting at the valve seat, each such hole having concentric channels round it in the valve seat to take up a sealant, the diaphragm being generally free of holes therethrough and being held in a middle part thereof against the valve seat so that it may be freely moved in relation to the valve openings.

In addition to completely effecting the purposes noted, one useful effect of the invention is that the valve of the invention has a very low opening pressure, which has so far not been produced in any other valve design. In fact, the opening pressure may be in the order of 1 to 2 millibar or 10 to 20 mm head of water. The diaphragm, which may be freely moved, at least at the valve openings, makes these low opening pressures possible because it is hardly necessary for any mechanical forces to have to be overcome. Because furthermore each of the valve openings has concentric channels round it which are full of sealant, as for example a silicone oil,(needed because of the low opening pressure) the valve is completely air-tight so that even after the valve has been opened a number of times, enough sealant will still be present so that the valve of the invention may be worked free of trouble and with the desired function for its full working life. A further, important useful effect is that the valve openings are placed spaced from each other, that is to say not within a limited space and may possibly be placed near the outer edge of the valve body so that at least some of the valve holes will still keep their function even if the valve becomes partly stopped up with dust-like packaged material.

As part of a more specially preferred form of the invention, the diaphragm is placed in the valve loosely and then locked in place by the diaphragm keeper which is locked or force-fitted in the valve body, the keeper resting against the outer face of the diaphragm. Such a design is useful, more specially from the point of view of production engineering in view of the mechanical, simple way of locking the diaphragm on the valve body and the shortcomings produced by welding are no longer likely. In the design of the invention, furthermore the quality of the connection between the diaphragm and the valve body has no effect on the function and the airtightness of the valve. For this reason, it would furthermore be possible for the diaphragm to be welded in the middle of the valve body, if the two parts are made of thermoplastic material.

LIST OF FIGURES AND DETAILED ACCOUNT OF WORKING EXAMPLES OF THE INVENTION

Further useful details of the invention will be seen from the dependent claims and the account now to be given of different forms of the invention, given by way of example only, using the figures.

FIG. 4 is a side view of the example of the invention to be seen in FIG. 1.

FIG. 5 is a view of part of the structure of FIG. 4 on a larger scale.

Figure 1:
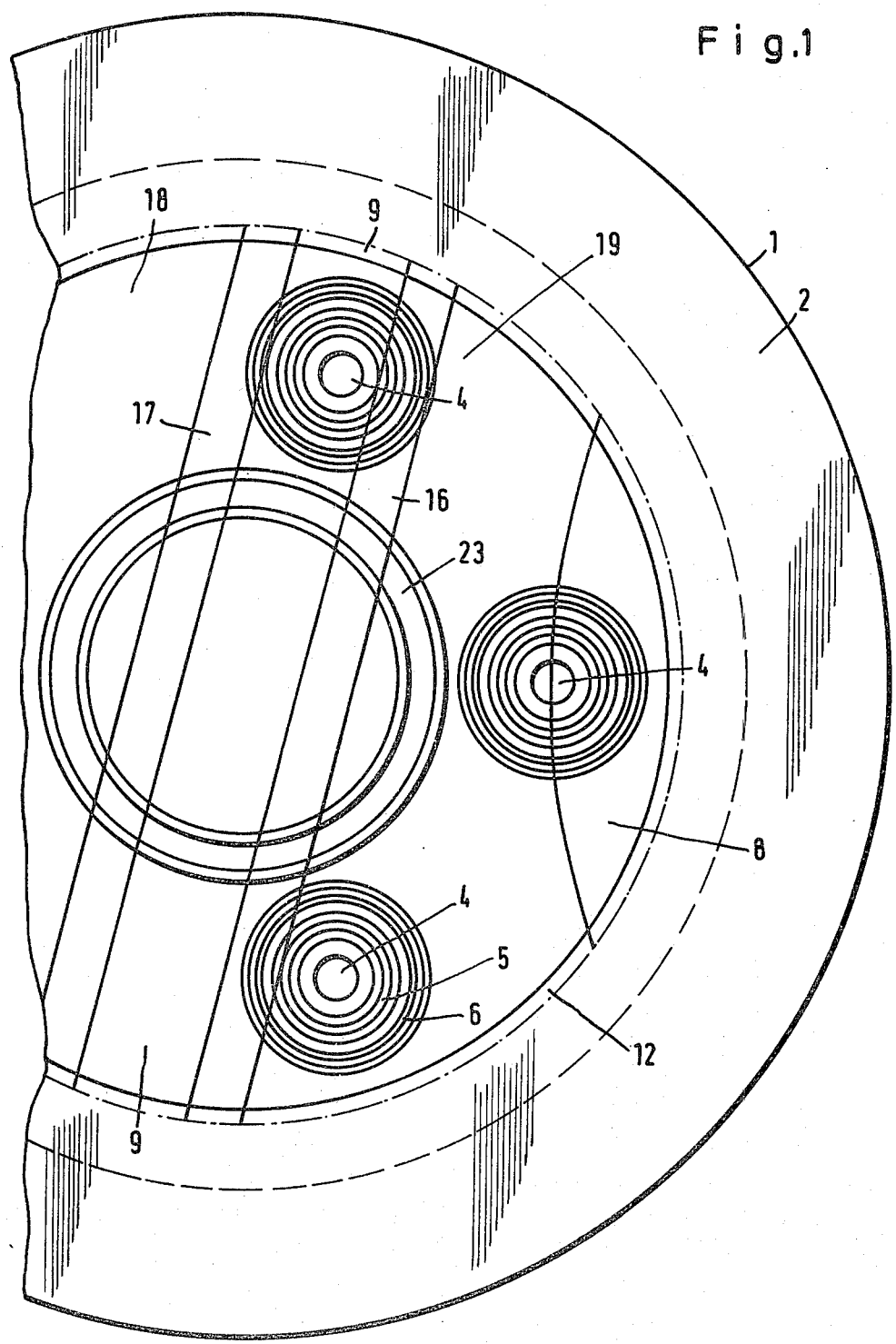
FIG. 1 is a face-on view of part of a valve in which, however, the keeper and the diaphragm are presented as if they were transparent to give the reader a clearer picture of the structure of the valve.
Figure 2:
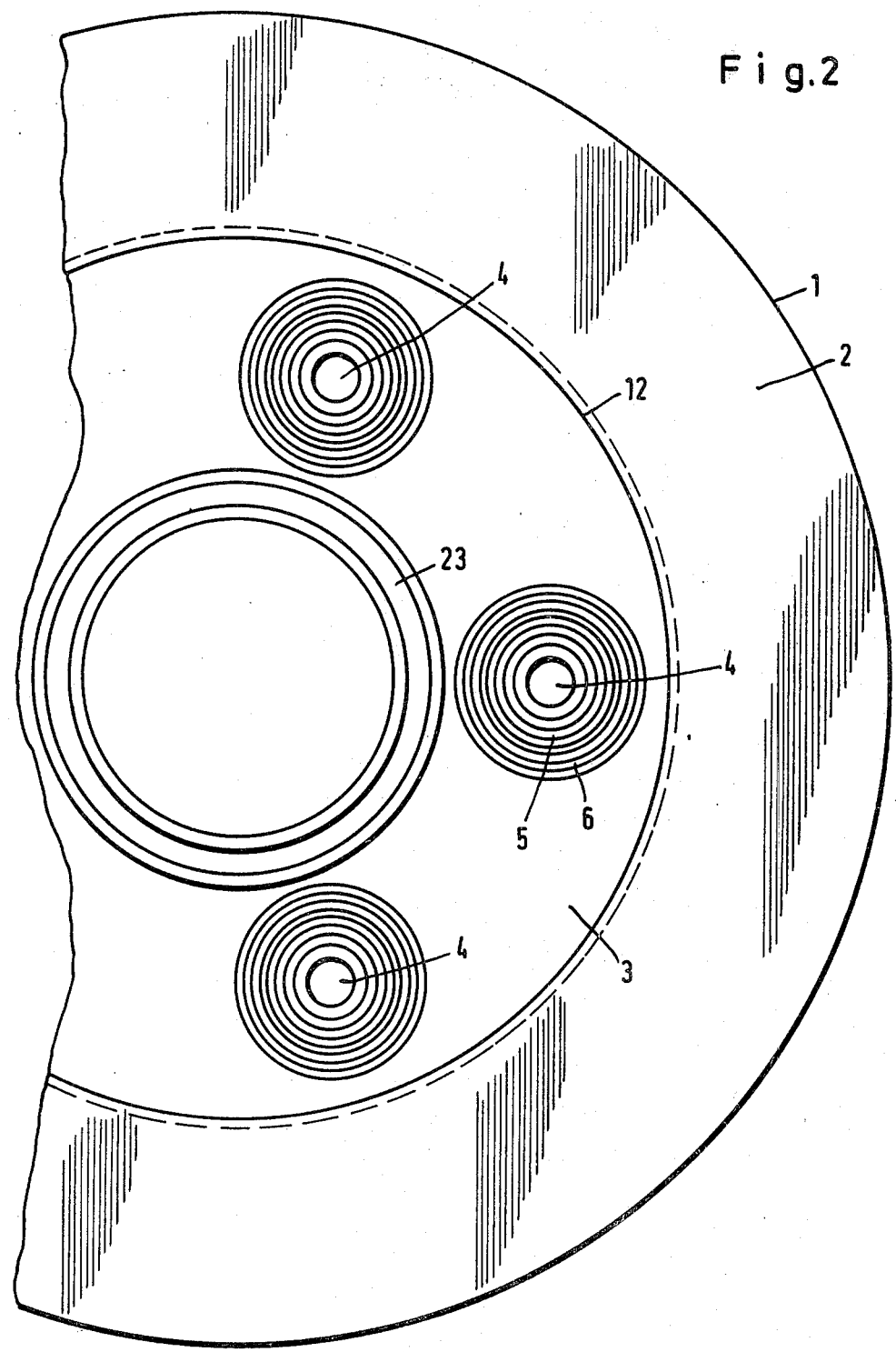
FIG. 2 is a plan view of the valve body of FIG. 1 with part of the body broken away.
Figure 3:
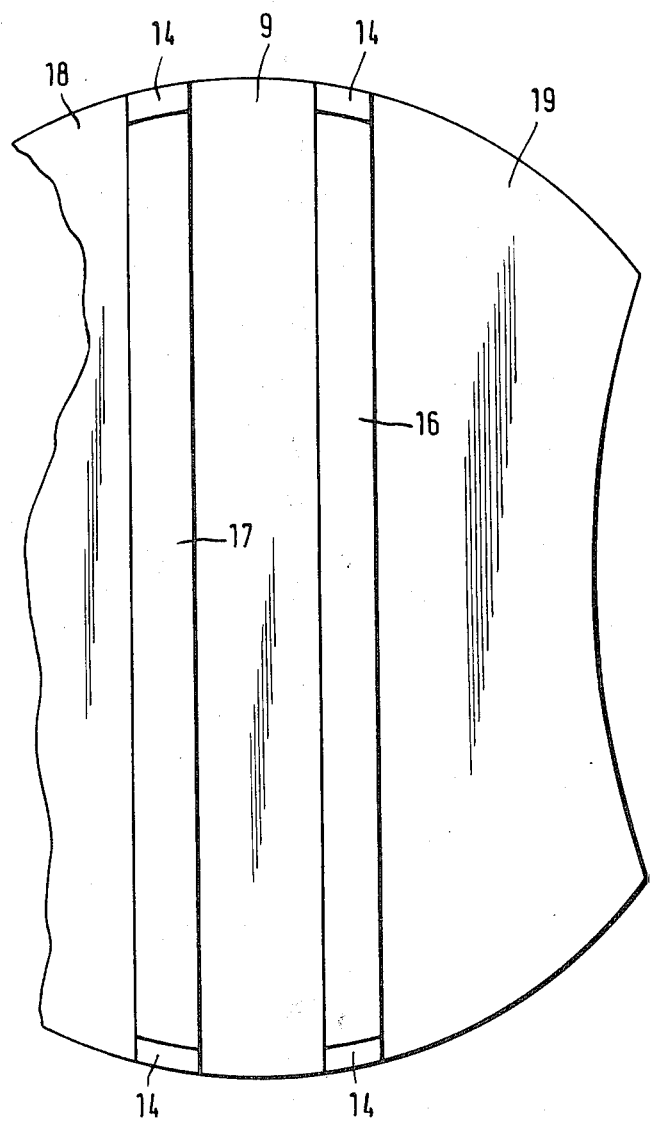
FIG. 3 is a plan view of part of the keeper of the working example to be seen in FIG. 1.

The valve 1 of FIGS. 1 to 5 is made up generally of a valve body 2, which has an inner valve seat 3 or valve seat face with a diaphragm 8 resting against it, having the function of shutting off the valve.

The valve body 2 is, in the present preferred working example of the invention, in the form of a round plate of about 2 cm in diameter. As may be seen, in the present working example of the invention, the valve seat 3 is flat and has a number of holes 4 running therethrough, that is to say joining the seat side of the valve body with the opposite face or side thereof. Holes 4 are in fact the valve openings of the present valve. In the current working example there are five such holes 4 at an equal distance from the middle point of the valve body 2.

Each of the holes 4 has concentric channels 5 and 6 in the valve seat 3 running round it, such channels being full of, and storing sealant 7. Such sealant may, more specially, be a silicone oil, such sealant forming a film, not to be seen in the figures, all over the valve seat and completely wetting not only the lower side of diaphragm 8, but furthermore the seat 3. Channels 5 and 6 are used for making up losses from this oil film after operation of the valve 1. For the same purpose it would be possible in addition (see the figures) to have a ring-channel 23 placed round, and centered on, the middle point of the valve body 2, to take up sealant as well.

As figured, valve body 2 will be seen to be generally pot-like with a hollow space 10 therein (see FIG. 4), the floor of such space being seat 3. The seat 3 is limited by a groove 11 in the upright sidewall of hollow 10. The top of the sidewall has an inwardly running lip 12, which, by the nature of things, will have a smaller inner diameter than floor of groove 11. The lower face of lip 12, turned towards seat 3, is placed at a slope running inwards and upwards at 13.

As may furthermore be seen from the figures, the diameter of the diaphragm 8 is smaller than the diameter of the valve seat or seat face 3 and, in the present preferred working example of the invention, is the same as the inner diameter of lip 12.

Diaphragm 8 is kept in position on the valve seat 3 by a keeper 9 which, as will be seen from the figures, is only forced against a middle part of the diaphragm 8, pushing the same against valve seat 3.

In the preferred working example of the invention, the keeper 9 is made up generally in the form of a horizontal I-girder 16, 17, having side wings 18, 19, such wings partly covering over the diaphragm 8 when the keeper 9 has been put in place. The I-girder form of the keeper is used so that less material is needed for the keeper, the side wings 18, 19 only acting as guard plates for covering over the diaphragm 8. Wings 18 and 19 are spaced from the diaphragm 8.

It would furthermore be possible to have a changed design in which the keeper girder would simply be in the form of a straight bar without wings 18, 19, if such wings are not necessary. The keeper 9 may be force-fitted or keyed on or into the valve body 2 so that the diaphragm 8 is only acted upon in its middle part, welding, which would be a complex operation, not being necessary.

In the preferred working example of the invention, the two ends of the I-girder 16, 17 have sloping faces 14, 15 answering to the sloping face 13 so that, when the keeper 9 is forced home, it is locked in position behind sloping face 13. To make it possible for the keeper 9 to be put in position upsidedown or the right way up on putting valves 1 together, the sloping faces 14,15 are on the top side and furthermore on the lower side of the keeper 9.

Figure 6:
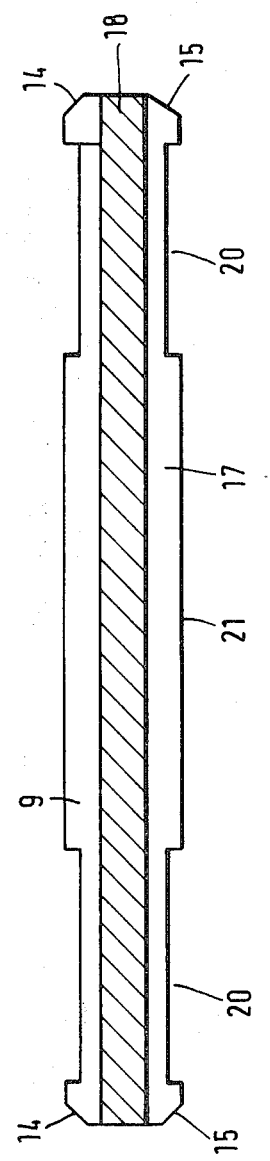
FIG. 6 is a view of a further working example of the keeper of the invention for use in the valve structure of FIG. 1.

As will be seen from the view of FIG. 1, it may be that the acting face of the keeper is placed over one of the valve holes 14 covering it up when the valve is put together. To take care of this possible shortcoming, in the somewhat changed form of the invention of FIG. 6, the function of such a covered over hole is still possible.

This is because the keeper 9 is let back somewhat at 20 so that it is spaced somewhat from the top face of the diaphragm 8 so that only the middle part 21 of keeper 9 is rested against the diaphragm the parts 20 are clear thereof. However, because there is a number holes 4 in the valve seat 3, this design of the keeper is not necessary in all cases.

For joining up the valve 1 with a package, valve body 2 has an outwardly running lip 22 at its top edge which may be used for sticking or welding the valve body 2 to the package 24 so as to be fluid-tight.

All parts of the valve, that is to say the valve body 2, the diaphragm 8 and the keeper 9 are best made of a thermoplastic material such as, more specially, polyethylene, low-pressure polyethylene or polypropylene.

ACCOUNT OF WORKINGS OF THE VALVE

If pressure outside the package is greater than that within it, the diaphragm 8 will be forced against the valve seat 3 by said outside pressure. The sealant present in the channels 5, 6 and 23 will, in this respect, be of help in making certain of a complete sealing effect.

If there is a building up of pressure within the package, the face of the diaphragm 8 over the holes 4 will be acted upon by pressure and once the pressure within the package has taken on a pressure value (which is very low in comparison with the prior art) of about 1 to 2 millibars, the diaphragm 8 is moved clear of the valve seat 3. Because the two parts of the diaphragm 8 to the sides of the keeper girder 16, 17 may be winged upwards quite freely, even a low gage pressure within the package will be great enough for starting such an opening effect. In this respect the diaphragm does not have to overcome any friction in a radial direction. Because, furthermore, there is a number of holes 4 with their channels 5 and 6, it is possible to make certain that at least two to three holes 4 will be functioning. In the case of ground coffee there will, in many cases, be no stopping such coffee dust making its way into the let-off holes so that such holes become stopped up and the valve unit will no longer be in full working order. In the valve 1 of the invention, however, this is of generally little effect and furthermore even very fine grains getting as far as the valve seat 3, may be taken up in one of the channels so that the function of the valve will hardly be any less good than it was in the first place.

Once the pressure inside the package has gone down below the opening pressure, the elastic diaphragm 8 will come to rest again on the valve seat 3 so that the inside of the package will again be fluid-tightly shut off from the outside. Because of the elastic effect, the shutting pressure of the diaphragm 8 is somewhat greater than the outside pressure. Once a great enough pressure difference has come into being, for example on degassing the packaged material, the gas will be let off again.

Because, furthermore, all parts of the valve 1 of the invention are only mechanically joined together, that is to say by a force-fit or by a keying or locking effect, there is a wide, more or less unlimited range of materials which may be used for the separate parts. For example the opening pressure of the valve may be changed within wide limits by the right choice of the material and the thickness of the diaphragm 8. Furthermore, a useful effect may be produced if the keeper 9 is colored so as to be matching the color of the complete package or used as a marking to make clear the opening pressure of the valve.

Although a detailed account of the invention has been given using two possible working examples, it will be clear that an expert in the field might make a different change in the design without giving up the main idea on which the invention is based. To take an example, the low opening pressure, which gives a useful effect, of a valve of the present invention might be made certain of by using a button-like part, fixed in place in the middle part of the diaphragm 8 only, in place of the keeper stretching right the way across the valve body 2, button-like part might be fixed in place mechanically or by spot-welding in the middle.

All measures of the present invention to be seen in the present account, the claims and the figures, and all the useful effects thereof, together with details of the design and form may be important for the invention separately or when grouped together.

I claim:

1. In an overpressure valve for a flexibly walled package, having a valve body designed to be fixed air-tightly in said wall and an elastic diaphragm in said body placed so that valve openings in said valve body are shut by said diaphragm resting against a valve seat of said body, said openings in said seat being at the ends of holes stretching through said body from said seat to an opposite side of said body, the invention residing in that each of the valve openings in the valve seat at the ends of said holes running through said body has at least two concentric channels placed around it in the valve seat, such channels having a sealant therein, said diaphragm being generally free of any hole and being supported at a middle part thereof against said valve seat, whereas parts of said diaphragm next to said valve openings are able to be freely winged towards away from said seat.

2. The overpressure valve as claimed in claim 1 having a keeper for keeping said diaphragm in position and wherein said diaphragm is loosely placed in position and is kept in place by said keeper resting against an outer face of said diaphragm.

3. The overpressure valve as claimed in claim 2, wherein said keeper is keyed in said valve body.

4. The overpressure valve as claimed in claim 1 or claim 2, wherein said valve body is hollow and pot-like, a floor of said valve body forming said valve seat.

5. The overpressure valve as claimed in claim 2, wherein said keeper is keyed in said valve body, the valve body having a side wall which is inwardly grooved and into which the keeper may be keyed springingly.

6. The overpressure valve as claimed in claim 5 wherein said valve body has an inwardly radially running lip, behind which said keeper is springingly keyed.

7. The overpressure valve as claimed in claim 6 wherein said inwardly running lip has a sloping face turned towards said valve seat, said keeper having sloping faces at ends thereof for resting against said sloping face.

8. The overpressure valve as claimed in claim 2 wherein said valve body is hollow and pot-like, a floor of said valve body forming said valve seat, said keeper being in the form of a girder stretching over the inner part of said valve body.

9. The overpressure valve as claimed in claim 8 wherein said girder is an I-girder.

10. The overpressure valve as claimed in claim 8 wherein said girder has side wings forming parts thereof, spaced from said diaphragm.

11. The overpressure valve as claimed in claim 1 wherein said valve seat is round.

12. The overpressure valve as claimed in claim 11 wherein said valve openings are at an equal distance from a middle point on said valve seat.

13. The overpresssure valve as claimed in claim 10, wherein said diaphragm is round and has a diameter less than the diameter of the valve seat.

14. The overpressure valve as claimed in claim 7 wherein said diaphragm is round and has a diameter the same as the inner diameter of the said lip.

15. The overpressure valve as claimed in claim 1 or claim 2, having five valve openings.

16. The overpressure valve as claimed in claim 2 wherein the keeper is let back at positions opposite to the valve openings so that at such positions the keeper is spaced from the diaphragm's face facing said keeper.

17. The overpressure valve as claimed in anyone of claims 2 or 5, wherein at least one the three parts, namely: the valve body, the keeper, the diaphragm, is made of a thermoplastic material.

18. The overpressure valve as claimed in anyone of claims 2 or 5, wherein at least one of the three parts, namely: the valve body, the keeper, the diaphragm, is made of a thermoplastic material, such thermoplastic material being selected from the group: polyethylene, low-pressure polyethylene, polypropylene.

19. The overpressure valve as claimed in claim 2, wherein said keeper is colored.

20. The overpressure valve as claimed in claim 1 wherein said valve body has a top edge with an outwardly running flange for making a fluid-tight joint with a package wall.

21. The overpressure valve as claimed in claim 1, having a further ring-like channel in the valve seat and concentric thereto for said sealant.

22. The overpressure valve as claimed in claim 21 having said further ring-like channel radially within said valve openings.

23. The overpressure valve as claimed in claim 21 wherein said ring like-channel is placed radially outside said valve openings.

* * * * *